United States Patent
Nakajima et al.

(12)

(10) Patent No.: US 6,790,488 B1
(45) Date of Patent: *Sep. 14, 2004

(54) LIQUID-CRYSTALLINE MEDIUM

(75) Inventors: Shinji Nakajima, Kanagawa Pref. (JP);
Akiko Takashima, Kanagawa Pref.
(JP); Yasushi Sugiyama, Kanagawa-ken
(JP); Hideo Ichinose, Kanagawa Pref.
(JP)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/049,020

(22) PCT Filed: Jul. 21, 2000

(86) PCT No.: PCT/EP00/07027
§ 371 (c)(1),
(2), (4) Date: Feb. 8, 2002

(87) PCT Pub. No.: WO01/12751
PCT Pub. Date: Feb. 22, 2001

(30) Foreign Application Priority Data

Aug. 11, 1999 (EP) ............................................ 99115828

(51) Int. Cl.[7] ........................ C09K 19/30; C09K 19/34; C09K 19/20
(52) U.S. Cl. .............. 428/1.1; 252/299.61; 252/299.63; 252/299.66
(58) Field of Search ....................... 252/299.63, 299.66; 428/1.1

(56) References Cited

U.S. PATENT DOCUMENTS 6,544,602 B1 * 4/2003 Hirschmann et al. ........ 428/1.1
6,613,401 B2 * 9/2003 Hirschmann et al. ........ 428/1.1
2002/0119262 A1 * 8/2002 Hirschmann et al. ........ 428/1.1

FOREIGN PATENT DOCUMENTS

| DE | 198 44 321 | 4/1999 |
| EP | 0 598 354 | 5/1994 |
| EP | 0 832 955 | 4/1998 |

* cited by examiner

*Primary Examiner*—Shean O. Wu
(74) *Attorney, Agent, or Firm*—Millen, White, Zelano & Branigan, P.C.

(57) ABSTRACT

The invention relates to a liquid-crystalline medium based on a mixture of polar compounds having positive dielectric anisotropy, characterized in that it comprises one or more compounds of general formula (I) and one or more compounds of general formula (I*) in which R, $R^{1*}$, $R^{2*}$, $A^1$, $Z^1$, Y, L, $L^{1*}$, $L^{2*}$, m, x and y are as defined in claim 1.

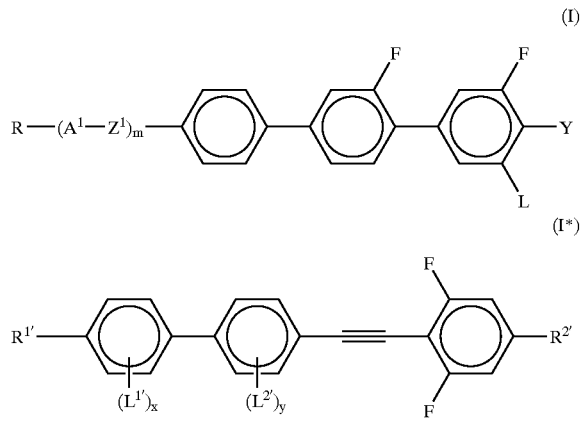

22 Claims, No Drawings

LIQUID-CRYSTALLINE MEDIUM

The present invention relates to a liquid-crystalline medium, to the use thereof for electro-optical purposes, and to displays containing this medium.

Liquid crystals are used, in particular, as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN (twisted nematic) cells, STN supertwisted nematic) cells, SBE (superbirefringence effect) cells and OMI (optical mode interference) cells. The most common display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have relatively low viscosity and give short addressing times, low threshold voltages and high contrast in the cells.

Furthermore, they should have a suitable mesophase, for example a nematic or cholesteric mesophase for the above mentioned cells, at conventional operating temperatures, i.e. in the broadest possible range above and below room temperature. Since liquid crystals are generally used in the form of mixtures of a plurality of components, it is important that the components are readily miscible with one another. Further properties, such as the electrical conductivity, the dielectric anisotropy and the optical anisotropy, must satisfy different requirements depending on the cell type and area of application. For example, materials for cells having a twisted nematic structure should have positive dielectric anisotropy and low electrical conductivity.

For example, media of large positive dielectric anisotropy, broad nematic phases, relatively low birefringence, very high resistivity, good UV and temperature stability and low vapour pressure are desired for matrix liquid-crystal displays having integrated non-linear elements for switching individual pixels (MLC displays).

Matrix liquid-crystal displays of this type are known. Examples of non-linear elements which can be used for individual switching of individual pixels are active elements (i.e. transistors). This is then referred to as an "active matrix", and a differentiation can be made between two types:

1. MOS (metal oxide semiconductor) or other diodes on silicon wafers as substrate.
2. Thin-film transistors (TFTs) on a glass plate as substrate.

Use of single-crystal silicon as the substrate material limits the display size, since even modular assembly of the various part-displays results in problems at the joints.

In the case of the more promising type 2, which is preferred, the electro-optical effect used is usually the TN effect. A differentiation is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, whilst the other glass plate carries the transparent counterelectrode on the inside. Compared with the size of the pixel electrode, the TFT is very small and has virtually no adverse effect on the image. This technology can also be extended to fully colour-compatible image displays, where a mosaic of red, green and blue filters is arranged in such a way that each filter element is located opposite a switchable pixel.

The TFT displays usually operate as TN cells with crossed polarizers in transmission and are illuminated from the back.

The term MLC displays here covers any matrix display containing integrated non-linear elements, i.e., in addition to the active matrix, also displays containing passive elements, such as varistors or diodes (MIM=metal-insulator-metal).

MLC displays of this type are particularly suitable for TV applications (for example pocket TV sets) or for high-information displays for computer applications (laptops) and in automobile or aircraft construction. In addition to problems with respect to the angle dependence of the contrast and the response times, problems arise in MLC displays owing to inadequate resistivity of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display drops, and the problem of after-image elimination can occur. Since the resistivity of the liquid-crystal mixture generally drops over the life of an MLC display owing to interaction with the internal surfaces of the display, a high (initial) resistance is very important in order to obtain acceptable service lives. In particular in the case of low-voltage mixtures, it was hitherto not possible to achieve very high resistivities. It is furthermore important that the resistivity increases as little as possible with increasing temperature and after heating and/or exposure to UV radiation. Also particularly disadvantageous are the low-temperature properties of the mixtures from the prior art. It is required that crystallization and/or smectic phases do not occur, even at low temperatures, and that the temperature dependence of the viscosity is as low as possible. MLC displays of the prior art thus do not satisfy current requirements.

There thus continues to be a great demand for MLC displays having very high resistivity at the same time as a broad operating temperature range, short response times, even at low temperatures, and low threshold voltage which do not have these disadvantages or only do so to a reduced extent.

In the case of TN (Schadt-Helfrich) cells, media are desired which facilitate the following advantages in the cells:

broadened nematic phase range (in particular down to low temperatures), switchability at extremely low temperatures (outdoor use, automobile, avionics), increased stability on exposure to UV radiation (longer life).

The media available from the prior art do not enable these advantages to be achieved while simultaneously retaining the other parameters.

In the case of supertwisted cells (STN), media are desired which enable greater multiplexibility and/or lower threshold voltages and/or broader nematic phase ranges (in particular at low temperatures). To this end, a further extension of the parameter latitude available (clearing point, smectic-nematic transition or melting point, viscosity, dielectric quantities, elastic quantities) is urgently desired.

The invention has the object of providing media, in particular for MLC, TN or STN displays of this type, which do not have the above mentioned disadvantages, or only do so to a reduced extent, and preferably at the same time have very high resistivities and low threshold voltages and simultaneously low values for the rotational viscosity $\gamma_1$.

It has now been found that this object can be achieved when novel media are used in displays.

The invention thus relates to a liquid-crystalline medium based on a mixture of polar compounds having positive dielectric anisotropy, characterized in that it comprises one or more compounds of the general formula I,

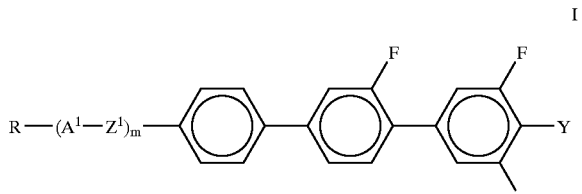

I and one or more compounds of the general formula I*

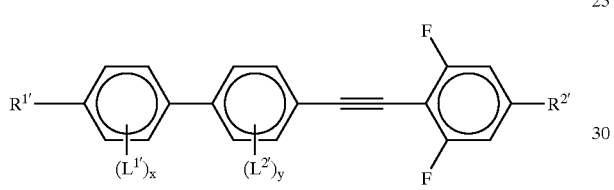

I* in which

R, $R^{1*}$ and $R^{2*}$ are in each case, independently of one another, H, an alkyl or alkenyl radical having 1 to 15 carbon atoms which is unsubstituted, monosubstituted by CN or $CF_3$ or at least monosubstituted by halogen, it also being possible for one or more $CH_2$ groups in these radicals to be replaced, in each case independently of one another,

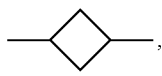,

—C≡C—, —CO—, —CO—O—, —O—CO—, —S— or —O—CO—O— in such a way that O atoms are not linked directly to one another, $A^1$ (a) is a trans-1,4-cyclohexylene radical in which, in addition, one or more non-adjacent $CH_2$ groups may have been replaced by —O— and/or —S—, or a 1,4-cyclohexenylene radical, (b) is a 1,4-phenylene radical, in which, in addition, one or two CH groups may have been replaced by N, (c) is a radical from the group consisting of 1,4-bicyclo[2.2.2]-octylene, piperidine-1,4-diyl, naphthalene-2,6-diyl, decahydronaphthalene-2,6-diyl and 1,2,3,4-tetrahydronaphthalene-2,6-diyl, where the radicals (a) and (b) may be monosubstituted, disubstituted or poly substituted by CN, $CH_3$ or F, $Z^1$ is —CO—O—, —O—CO—, —$CH_2$O—, —O$CH_2$—, —$CH_2CH_2$—, —CH=CH—, —$C_2F_4$—, —$CF_2$O—, —O$CF_2$—, —C≡C—, —$(CH_2)_4$—, —CH=CH—$CH_2CH_2$— or a single bond, Y is F, Cl, halogenated alkyl, alkenyl, alkenyloxy, alkoxyalkyl or alkoxy having 1 to 6 carbon atoms, L is H or F, $L^{1*}$ and $L^{2*}$ are in each case independently of one another H or F, x and y are in each case independently of one another 0, 1, 2, 3 or 4, and m is 0 or 1.

The compounds of the formulae I and I* have a broad range of applications. Depending on the choice of substituents, these compounds can serve as base materials from which liquid-crystalline media are predominantly composed; however, compounds of the formula I and I* can also be added to liquid-crystalline base materials from other classes of compounds in order, for example, to modify the dielectric and/or optical anisotropy of a dielectric of this type, and/or to optimize its threshold voltage and/or its viscosity.

In the pure state, the compounds of the formula I and I* are colourless and form liquid-crystalline mesophases: in a temperature range which is favourably located for electro-optical use. They are stable chemically, thermally and to light.

Compounds of the formula

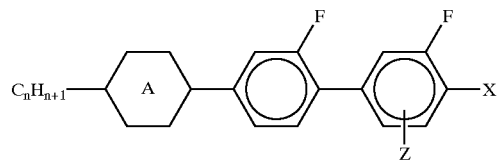

where X=F, Cl, $CF_3$, $CHF_2$, $OCHF_2$ or $OCF_3$, Z=H or F and ring A=1,4-cyclohexylene or 1,4-phenylene, have already been disclosed in WO 91/13850.

In the novel media comprising compounds of the formula I, Y is preferably F, Cl, $OCF_3$, $OCHF_2$, $CF_3$, $CHFCF_3$, $CFCHF_2$, $C_2H_4CHF_2$, $CF_2CH_2CF_3$, $CHF_2$, $OCH_2CF_3$, $OCH_2CHF_2$, $OCF_2CHF_2$, $O(CH_2)_3CF_3$, $OCH_2C_2F_5$, $OCH_2CF_2CHF_2$, $OCh_2C_3F_7$, $OCHFCF_3$, $OC_2F_5$, $OCF_2CHFCF_3$, OCH=$CF_2$, OCF=$CF_2$, OC=$CFCF_3$, OCF=CF—$C_2F_5$, CH=CHF, CH=$CF_2$, CF=$CF_2$, $CF_2OCF_3$, in particular F, $OCHFCF_3$, $OCF_3$, $OCHF_2$, $OC_2F_5$, $OC_3F_7$, OCH=$CF_2$ or $CF_2OCF_3$.

Particular preference is given to compounds of the formula I in which L=F and/or m=0.

$Z^1$ is preferably a single bond or —$CH_2CH_2$—, secondarily preferably —$CH_2$O—, —$OCH_2$—, —O—CO— or —CO—O—.

Compounds of the formula

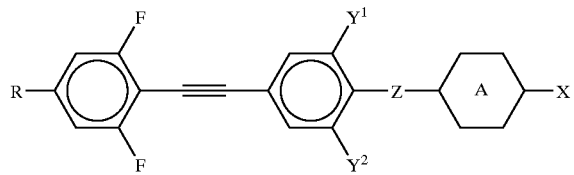

wherein R is alkyl, alkenyl, alkoxy, or alkenyloxy, $Y^1$ and $Y^2$ are F or H, X is alkyl, alkoxy or alkenyloxy, Ring A is 1,4-cyclohexylene or optionally fluorine-substituted 1,4-phenylene, have already been disclosed in EP 0 598 354B1.

If R, $R^{1*}$ or $R^{2*}$ is an alkyl radical and/or an alkoxy radical, this can be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Oxaalkyl is preferably straight-chain 2-oxapropyl (=methoxymethyl), 2- (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6-, or 7-oxaoctyl, 2-, 3-, 4-, 5-, 6-, 7- or 8-oxanonyl, or 2-, 3-, 4-, 5-, 6-, 7-, 8- or 9-oxadecyl.

If R, $R^{1*}$ or $R^{2*}$ is an alkyl radical in which one $CH_2$ group has been replaced by —CH=CH—, this can be straight-chain or branched. It is preferably straight-chain, has 2 to 10 carbon atoms and is vinyl, 1E-alkenyl or 3E-alkenyl. Accordingly, it is in particular vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl.

If R, $R^{1*}$ or $R^{2*}$ is an alkyl radical in which one $CH_2$ group has been replaced by —O— and one has been replaced by —CO—, these are preferably adjacent. These thus contain one acyloxy group —CO—O— or one oxycarbonyl group —O—CO—. These are preferably straight-chain and have 2 to 6 carbon atoms. Accordingly, they are in particular acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyl oxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxy-carbonylmethyl, 2-(methoxycarbonyl)ethyl, 2-(ethoxy-carbonyl)ethyl, 2-(propoxycarbonyl)ethyl, 3-(methoxy-carbonyl)propyl, 3-(ethoxycarbonyl)propyl or 4-(methoxycarbonyl)butyl.

If R, $R^{1*}$ or $R^{2*}$ is an alkyl radical in which one $CH_2$ group has been replaced by unsubstituted or substituted —CH=CH— and an adjacent $CH_2$ group has been replaced by CO or CO—O or O—CO, this can be straight-chain or branched. It is preferably straight-chain and has 4 to 13 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl and 9-methacryloyloxynonyl.

If R, $R^{1*}$ or $R^{2*}$ is an alkyl or alkenyl radical which is monosubstituted by CN or $CF_3$, this radical is preferably straight-chain. The substitution by CN or $CF_3$ is in any desired position.

If R, $R^{1*}$ or $R^{2*}$ is an alkyl or alkenyl radical which is at least monosubstituted by halogen, this radical is preferably straight-chain and halogen is preferably F or Cl. In the case of multiple substitution, halogen is preferably F. The resultant radicals also include perfluorinated radicals.

In the case of monosubstitution, the fluorine or chlorine substituent can be in any desired position, but preferably in the ω-position.

Compounds of the formula I and I* which contain wing groups R, $R^{1*}$ and/or $R^{2*}$ which are suitable for polyaddition reactions are suitable for the preparation of liquid-crystalline polyaddition products.

Compounds of the formulae I and I* containing branched wing groups R, $R^{1*}$ or $R^{2*}$ may occasionally be of importance due to better solubility in the customary liquid-crystalline base materials, but in particular as chiral dopes if they are optically active. Smectic compounds of this type are suitable as components for ferroelectric materials.

Compounds of the formula I and I* having $S_A$ phases are suitable, for example, for thermally addressed displays.

Branched groups of this type generally contain not more than one chain branch. Preferred branched radicals R, $R^{1*}$ and/or $R^{2*}$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methyl-butoxy, 2-methylpentoxy, 3-methylpentoxy, 2-ethylhexoxy, 1-methylhexoxy and 1-methylheptoxy.

If R, $R^{1*}$ or $R^{2*}$ is an alkyl radical in which two or more $CH_2$ groups have been replaced by —O— and/or —CO—O—, this may be straight-chain or branched. It is preferably branched and has 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxy carbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl) propyl, 4,4-bis(ethoxycarbonyl)butyl and 5,5-bis(ethoxycarbonyl)hexyl.

Preferred smaller groups of compounds of the formula I are those of the subformulae I1 to I5 [L=H or F]:

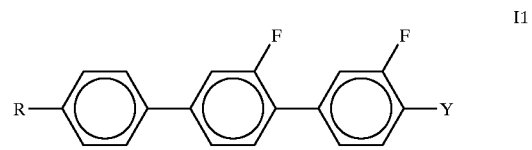

I1

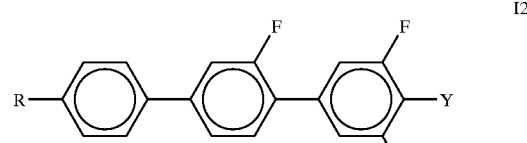

I2

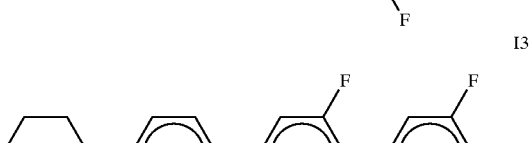

I3

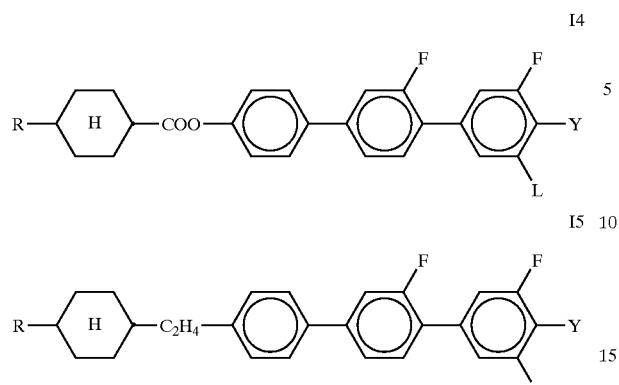

Particular preference is given to the compounds of the formulae I1 and I2. Especially preferred are compounds of the formulae I1 and I2 wherein Y is F, OCF₃ or OCHF₂. Especially preferred are compounds of the formulae I1a, I1b, I2a and I2b:

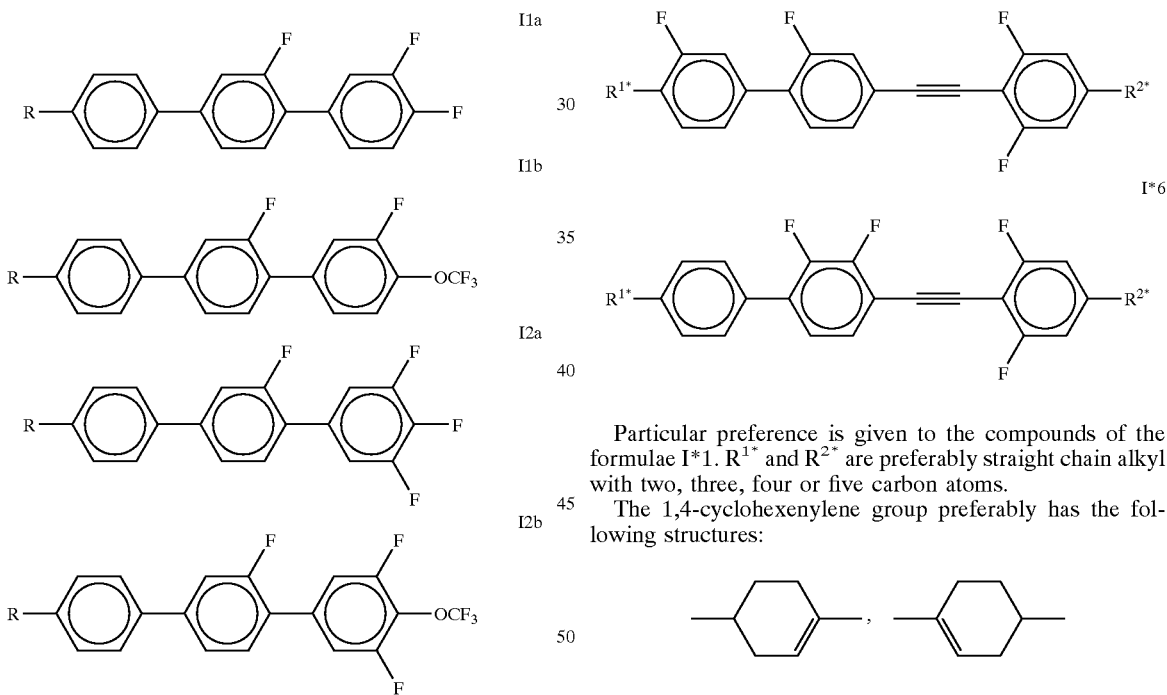

Preferred smaller groups of the formula I* are those of the subformulae I*1 to I*6:

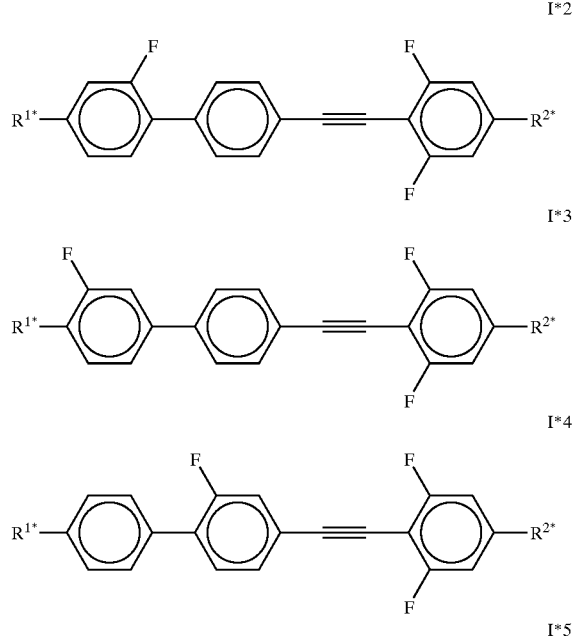

Particular preference is given to the compounds of the formulae I*1. R¹* and R²* are preferably straight chain alkyl with two, three, four or five carbon atoms.

The 1,4-cyclohexenylene group preferably has the following structures:

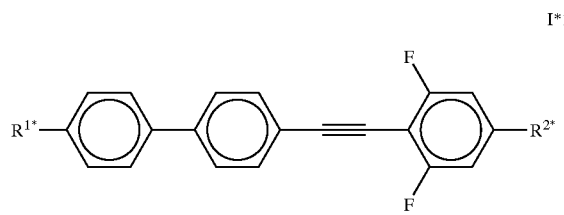

The compounds of the formula I and I* are prepared by methods known per se, as described in the literature (for example in the standard works, such as Houben-Weyl, Methoden der Organischen Chemie, Georg-Thieme-Verlag, Stuttgart), to be precise under reaction conditions which are known and suitable for said reactions, use can also be made here of variants which are known per se, but which are not mentioned here in greater detail.

The invention also relates to electro-optical displays (in particular STN or MLC displays having two plane-parallel substrate plates which, together with a frame, form a cell, integrated non-linear elements for switching individual pixels on the substrate plates, and a nematic liquid-crystal mixture of positive dielectric anisotropy and high resistivity located in the cell) which contain media of this type, and to the use of these media for electro-optical purposes.

The liquid-crystal mixtures according to the invention facilitate a significant broadening of the parameter latitude available.

The achievable combinations of rotational viscosity $\gamma_1$, clearing point, flow viscosity $v_{20}$ at low temperature, thermal and UV stability and dielectric anisotropy are far superior to previous materials from the prior art.

The requirement for a high clearing point, a nematic phase at low temperature and a high $\Delta\epsilon$ was previously only achievable to an unsatisfactory extent. Although systems such as, for example, ZLI-3119 have a comparable clearing point and comparatively favourable viscosities, they have, however, a $\Delta\epsilon$ of only +3.

Other mixture systems have comparable viscosities and values of $\Delta\epsilon$, but only have clearing points in the region of 60° C.

The liquid-crystal mixtures according to the invention make it possible to achieve clearing points of above 60°, preferably above 70°, particularly preferably above 80° C., and simultaneously dielectric anisotropy values $\Delta\epsilon \geq 6$, preferably $\geq 8$, and a high value for the resistivity which allows excellent STN and MLC displays to be achieved. In particular, the mixtures are characterized by low operating voltages. The TN thresholds are below 2.2 V, preferably below 2.0 V, particularly preferably <1.8 V.

It goes without saying that a suitable choice of the components of the mixtures according to the invention also allows higher clearing points (for example above 100°) to be achieved at higher threshold voltages or lower clearing points to be achieved at lower threshold voltages while retaining the other advantageous properties. It is likewise possible to obtain mixtures of relatively high $\Delta\epsilon$ and thus relatively low threshold if the viscosities are increased by a correspondingly small amount. The MLC displays according to the invention preferably operate in the first transmission minimum of Gooch and Tarry [C. H. Gooch and H. A. Tarry, Electron. Lett. 10, 2–4, 1974; C. H. Gooch and H. A. Tarry, Appl. Phys., Vol. 8, 1575–1584, 1975]; in this case, a lower dielectric anisotropy in the second minimum is sufficient in addition to particularly favourable electro-optical properties, such as, for example, high gradient of the characteristic line and low angle dependency of the contrast (German Patent 30 22 818) at the same threshold voltage as in an analogous display. This allows significantly higher resistivities to be achieved in the first minimum using the mixtures according to the invention than using mixtures containing cyano compounds. A person skilled in the art can use simple routine methods to produce the birefringence necessary for a prespecified layer thickness of the MLC display by a suitable choice of the individual components and their proportions by weight.

The flow viscosity $v_{20}$ at 20° C. is preferably <60 mm².s⁻1, particularly preferably <50 mm².s⁻¹. The nematic phase range is preferably at least 70°, in particular at least 80°. This range preferably extends at least from –20° to +80°.

Measurements of the "capacity holding ratio" (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formulae I and I* exhibit a considerably smaller decrease in the HR with increasing temperature than do analogous mixtures in which the compounds of the formulae I and I* are replaced by cyanophenylcyclohexanes of the formula

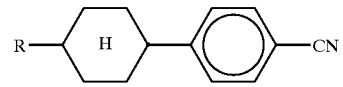

or esters of the formula

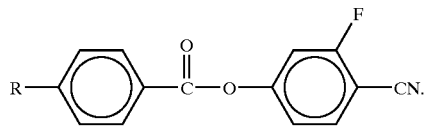

The UV stability of the mixtures according to the invention is also considerably better, i.e. they exhibit a significantly smaller decrease in the HR on exposure to UV radiation.

The media according to the invention are preferably based on a plurality (preferably two or more) of compounds of the formulae I and/or I*, i.e. the proportion of these compounds is 10 to 50%.

The individual compounds of the formulae I*, I to XVI and their sub-formulae which can be used in the media according to the invention are either known or can be prepared analogously to the known compounds.

Preferred embodiments are indicated below:

The medium comprises compounds of the formulae I and I* in which R, $R^{1*}$ or $R^{2*}$ is preferably ethyl, furthermore propyl, butyl or pentyl. Compounds of the formulae I and I* having short side chains R, $R^{1*}$ and/or $R^{2*}$ have a positive effect on the elastic constants, in particular $K_1$, and give mixtures having particularly low threshold voltages.

The medium additionally comprises one or more compounds selected from the group consisting of the general formulae II to IX:

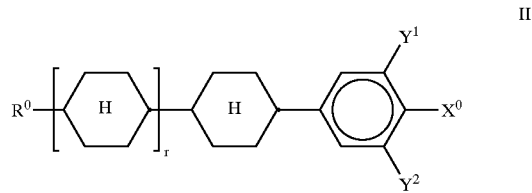

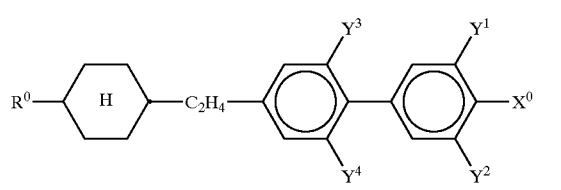

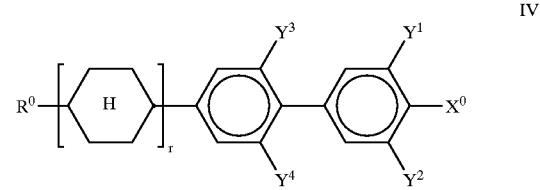

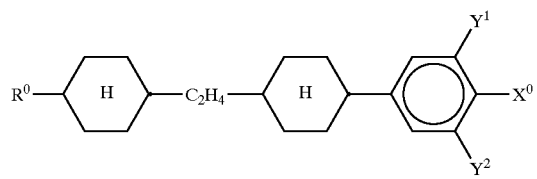

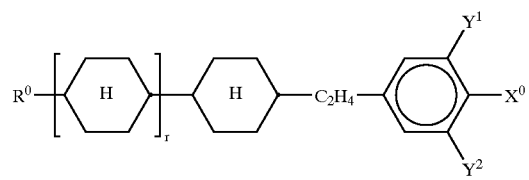

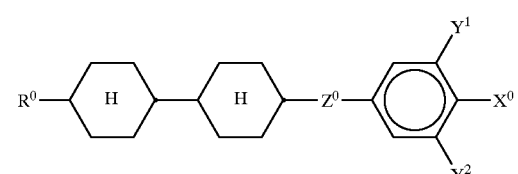

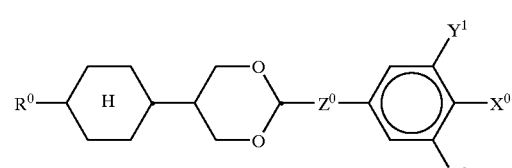

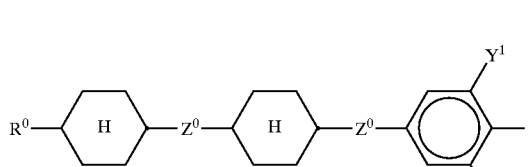

in which the individual radicals have the following meanings:

$R^0$ is n-alkyl, oxaalkyl, fluoroalkyl or alkenyl, in each case having up to 9 carbon atoms, $X^0$ is F, Cl, halogenated alkyl, alkenyloxy, alkylalkoxy, alkenyl or alkoxy having 1 to 6 carbon atoms.

$Y^1$ to $Y^4$ are in each case, independently of one another, H or F, and $Z^0$ is —CF$_2$O—, —OCF$_2$—, —C$_2$F$_4$—, —COO—, —OCH$_2$—, —CH$_2$O—, —CF=CF— or a single bond, r is 0 or 1.

The compound of the formula IV is preferably

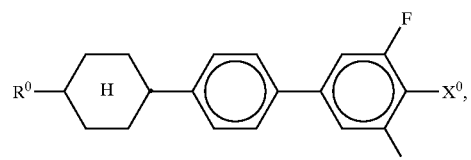

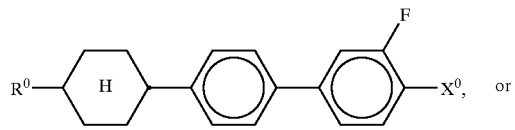

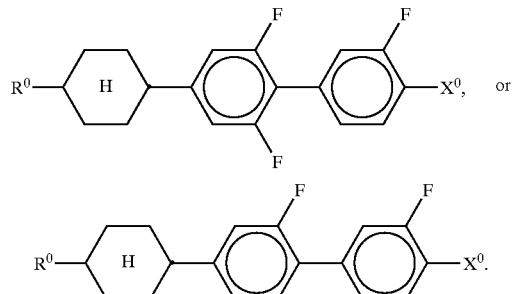

The compounds of the formula IV are preferably

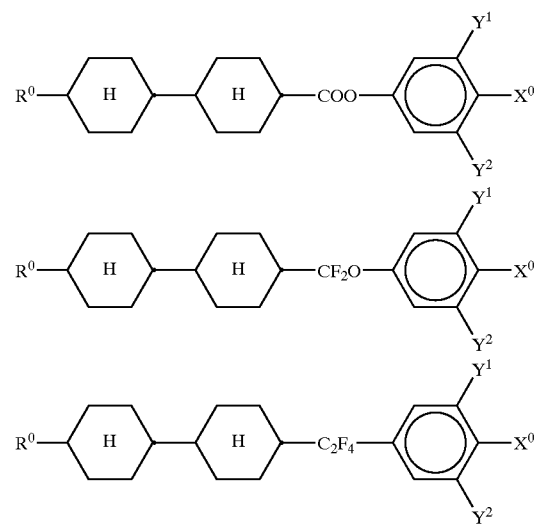

The compounds of the formula IX are preferably

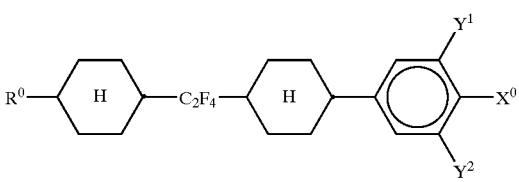

The medium additionally comprises one or more compounds of the formula

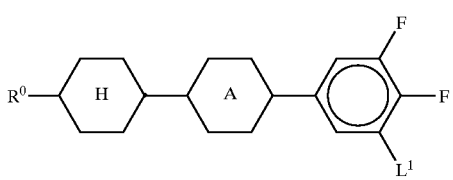

where

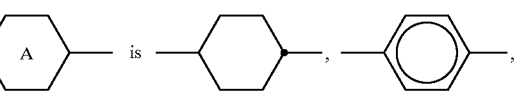

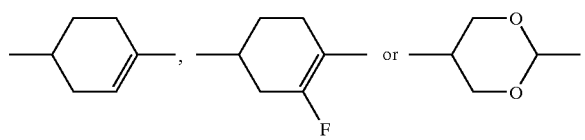

The medium additionally comprises one or more compounds of the formulae RI and/or RII:

RI
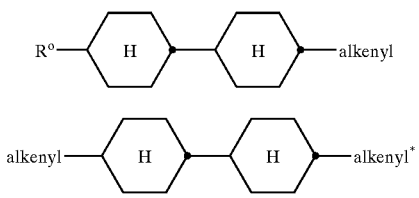

RII in which $R^0$ is as defined above, preferably straight-chain alkyl having 1–6 carbon atoms, and alkenyl and alkenyl* are preferably each, independently of one another, vinyl, 1E-alkenyl, 3E-alkenyl or 4-alkenyl having up to 9 carbon atoms.

The medium additionally comprises one or more compounds selected from the group consisting of the general formulae X to XVI:

X
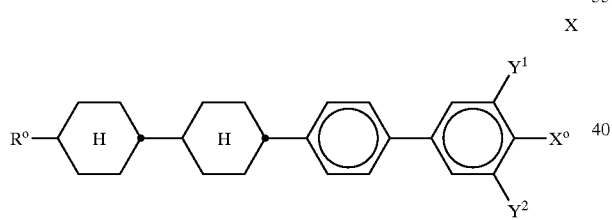

XI
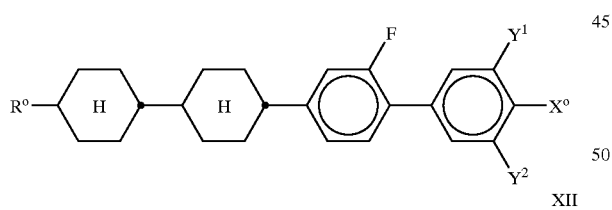

XII
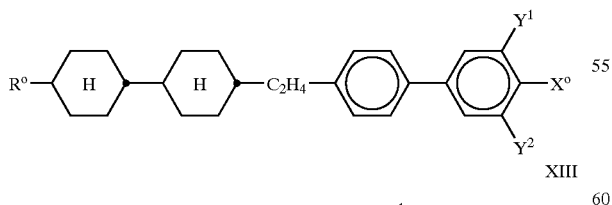

XIII
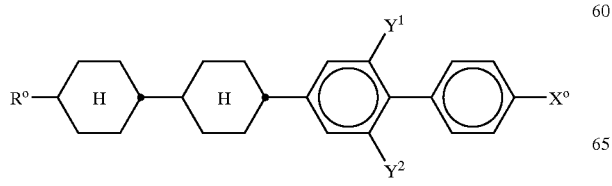

XIV
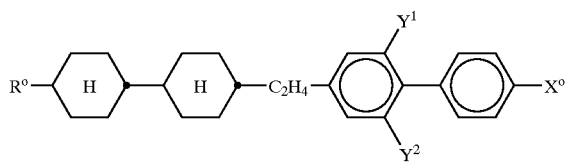

XV
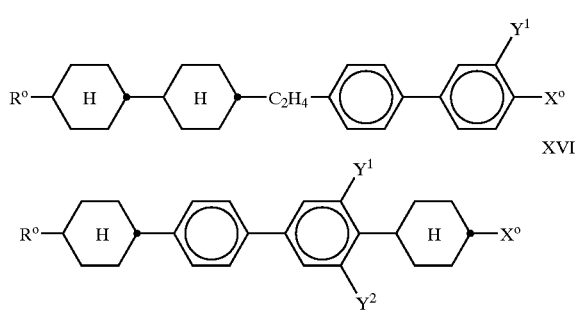

XVI in which $R^0$, $X^0$, $Y^1$ and $Y^2$ are each, independently of one another, as defined in claim 2. $X^0$ is preferably F, Cl, $CF_3$, $OCF_3$, $OCHF_2$. $R^0$ is preferably alkyl, oxaalkyl, fluoroalkyl or alkenyl, in each case having up to 6 carbon atoms.

The proportion of compounds of the formulae I to IX together is at least 50% by weight in the total mixture;

The proportion of compounds of the formulae I and I* is from 10 to 50% by weight in the total mixture;

The proportion of compounds of the formulae II to IX is from 20 to 80% by weight in the total mixture

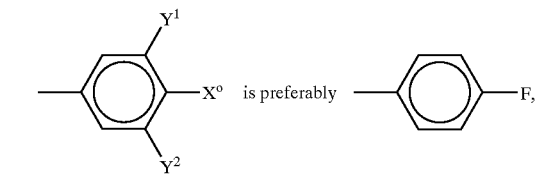

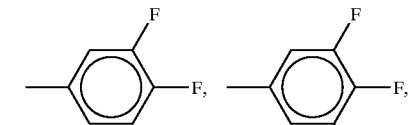

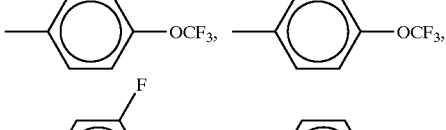

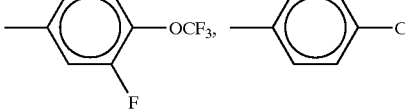

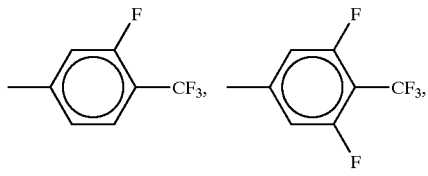

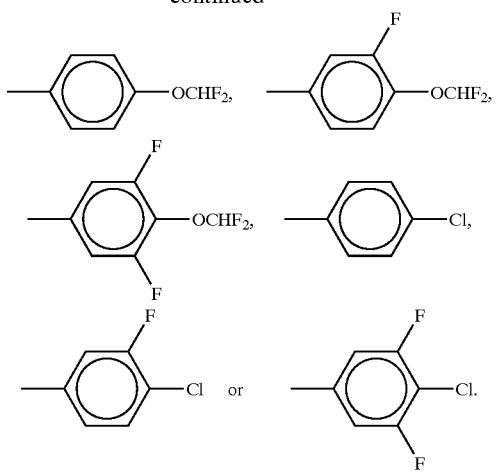

The medium comprises compounds of the formulae II, III, IV, V, VI, VII, VII and/or IX;

$R^0$ is straight-chain alkyl or alkenyl having 2 to 7 carbon atoms;

The medium essentially consists of compounds of the formulae I*, I to IX;

The medium comprises further compounds, preferably selected from the following group consisting of the general formulae XVII to XXIII:

XVII

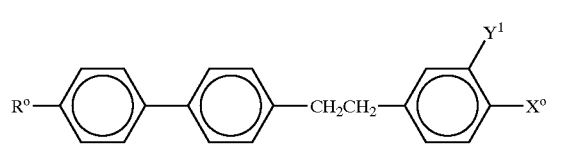

XVIII

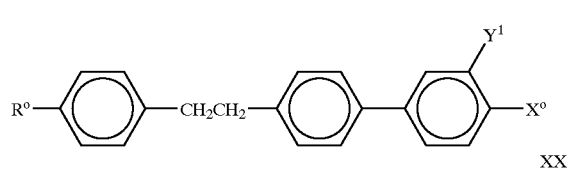

XIX

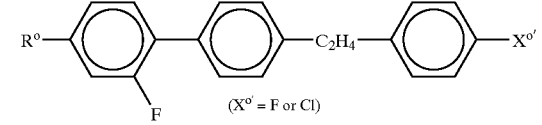

XX

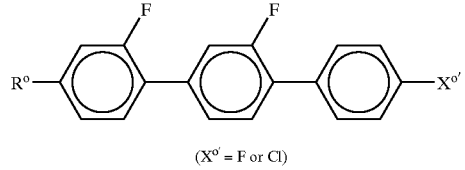

XXI

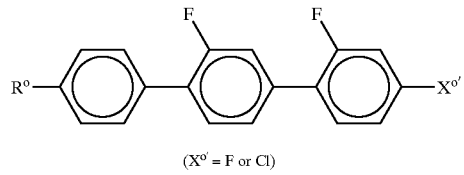

XXII

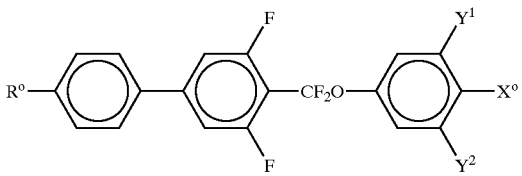

XXIII in which $R^0$, $X^0$ and $X^{0'}$ are as defined above.

The (I+I*): (II+III+IV+V+VI+VII+VIII+IX) weight ratio is preferably from 1:10 to 10:1

Medium essentially consists of compounds selected from the group consisting of the general formulae I*, I to XXIII.

It has been found that even a relatively small proportion of compounds of the formulae I and I* mixed with conventional liquid-crystal materials, but in particular with one or more compounds of the formulae II to IX, results in a significant reduction in the rotational viscosity $\gamma_1$ and in high birefringence values, and at the same time broad nematic phases with low smectic-nematic transition temperatures are observed, thus improving the shelf life. The compounds of the formulae I*, I to IX are colourless, stable and readily miscible with one another and with other liquid-crystal materials.

The term "alkyl" covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" or "alkenyl*" covers straight-chain and branched alkenyl groups having 2–7 carbon atoms, in particular the straight-chain groups. Particular alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups containing terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6, n is preferably 1 and m is preferably from 1 to 6.

Through a suitable choice of the meanings of $R^0$ and $X^0$, the addressing times, the threshold voltage, the gradient of the transmission characteristic lines, etc., can be modified as desired. For example, 1E-alkenyl radicals, 3E-alkenyl radicals, 2E-alkenyloxy radicals and the like generally give shorter addressing times, improved nematic tendencies and a higher ratio between the elastic constants $k_{33}$ (bend) and $K_{11}$ (splay) compared with alkyl and alkoxy radicals.

4-Alkenyl radicals, 3-alkenyl radicals and the like generally give lower threshold voltages and lower values of $k_{33}/k_{11}$ compared with alkyl and alkoxy radicals.

A —$CH_2Ch_2$— group in $Z^1$ generally results in higher values of $k_{33}/k_{11}$ compared with a simple covalent bond. Higher values of $k_{33}/k_{11}$ facilitate, for example, flatter transmission characteristic lines in TN cells with a 90° twist (for achieving grey tones) and steeper transmission characteristic lines in STN, SBE and OMI cells (greater multiplexibility), and vice versa.

The optimum mixing ratio of the compounds of the formulae I*, I and II+III+IV+V+VI+VII+VIII+IX depends substantially on the desired properties, on the choice of the components of the formulae I*, I, II, III, IV, V, VI, VII, VIII and/or IX and on the choice of any other components which may be present. Suitable mixing ratios within the above mentioned range can easily be determined from case to case.

The total amount of compounds of the formulae I*, I to XVI in the mixtures according to the invention is not crucial. The mixtures may therefore contain one or more further components in order to optimize various properties. However, the effect observed on the addressing times and the threshold voltage is generally greater the higher the total concentration of compounds of the formulae I*, I to XVI.

In a particularly preferred embodiment, the media according to the invention comprise compounds of the formulae II to IX (preferably II and/or III) in which $X^0$ is $OCF_3$, $OCHF_2$, F, $OCh=CF_2$, $OCF=CF_2$ or $OCF_2\text{-}CF_2H$. A favourable synergistic effect with the compounds of the formulae I and I* results in particularly advantageous properties.

The construction of the MLC display according to the invention from polarizers, electrode base plates and electrodes with surface treatment corresponds to the construction which is conventional for displays of this type. The term conventional construction here is broadly drawn and also covers all derivatives and modifications of the MLC display, in particular also matrix display elements based on poly-Si TFTs or MIMs.

An essential difference between the displays according to the invention and those customary hitherto based on the twisted nematic cell is, however, the choice of the liquid-crystal parameters in the liquid-crystal layer.

The liquid crystal mixtures according to the instant invention are particularly well suited for displays operating in the OCB (optically compensated birefringence) mode/OCB-displays due to their relatively large birefringence. The LC's in OCB-displays are characteristically hybrid aligned, with homeotropic alignment on one substrate and homogeneous alignment on the other substrate. These displays are favoured for displays showing gray-scales, as their electrooptical characteristics have a comparatively low steepness and practically no threshold at all.

The liquid-crystal mixtures which can be used according to the invention are prepared in a manner which is conventional per se. In general, the desired amount of the components used in the lesser amount is dissolved in the components making up the principal constituent, expediently at elevated temperature. It is also possible to mix solutions of the components in an organic solvent, for example in acetone, chloroform or methanol, and, after thorough mixing, to remove the solvent again, for example by distillation.

The dielectrics may also contain other additives known to those skilled in the art and described in the literature. For example, 0–15% of pleochroic dyes or chiral dopes can be added.

C denotes a crystalline phase, S a smectic phase, $S_c$ a smectic C phase, N a nematic phase and I the isotropic phase.

$V_{10}$ denotes the voltage for 10% transmission (view angle perpendicular to the plate surface). $t_{on}$ denotes the switch-on time and $t_{off}$ the switch-off time at an operating voltage corresponding to 2.5 times the value of $V_{10}$. $\Delta n$ denotes the optical anisotropy and $n_o$ the refractive index. $\Delta\in$ denotes the dielectric anisotropy ($\Delta\in=\in_{\|}-\in_{\perp}$, where $\in_{\|}$ is the dielectric constant parallel to the longitudinal molecular axes and $\in_{\perp}$ is the dielectric constant perpendicular thereto). The electro-optical data were measured in a TN cell at the 1st minimum (i.e. at a d.$\Delta n$ value of 0.5) at 20° C., unless expressly stated otherwise. The optical data were measured at 20° C., unless expressly stated otherwise.

In the present application and in the examples below, the structures of the liquid-crystal compounds are indicated by acronyms, with the transformation into chemical formulae taking place in accordance with Tables A and B below. All radicals $C_nH_{2n+1}$ and $C_mH_{2m+1}$ are straight-chain alkyl radicals containing n or m carbon atoms respectively (n, m: 1–12). The coding in Table B is self-evident. In Table A, only the acronym for the base structure is given. In individual cases, the acronym for the base structure is followed, separated by a hyphen, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | F | H |
| nF.F.F | $C_nH_{2n+1}$ | F | F | F |
| $nCF_3$ | $C_nH_{2n+1}$ | $CF_3$ | H | H |
| $nOCF_3$ | $C_nH_{2n+1}$ | $OCF_3$ | H | H |
| $nOCF_2$ | $C_nH_{2n+1}$ | $OCHF_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_2H_{2s}$— | CN | H | H |
| nAm | $C_nH_{2+1}$ | $COOC_mH_{2m+1}$ | H | H |
| $nOCCF_2$.F.F | $C_nH_{2n+1}$ | $OCH_2CF_2H$ | F | F |

Preferred mixture components are shown in Tables A and B.

TABLE A

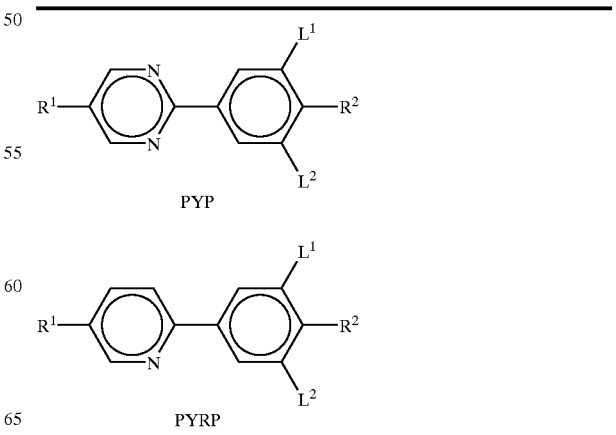

PYP

PYRP

TABLE A-continued
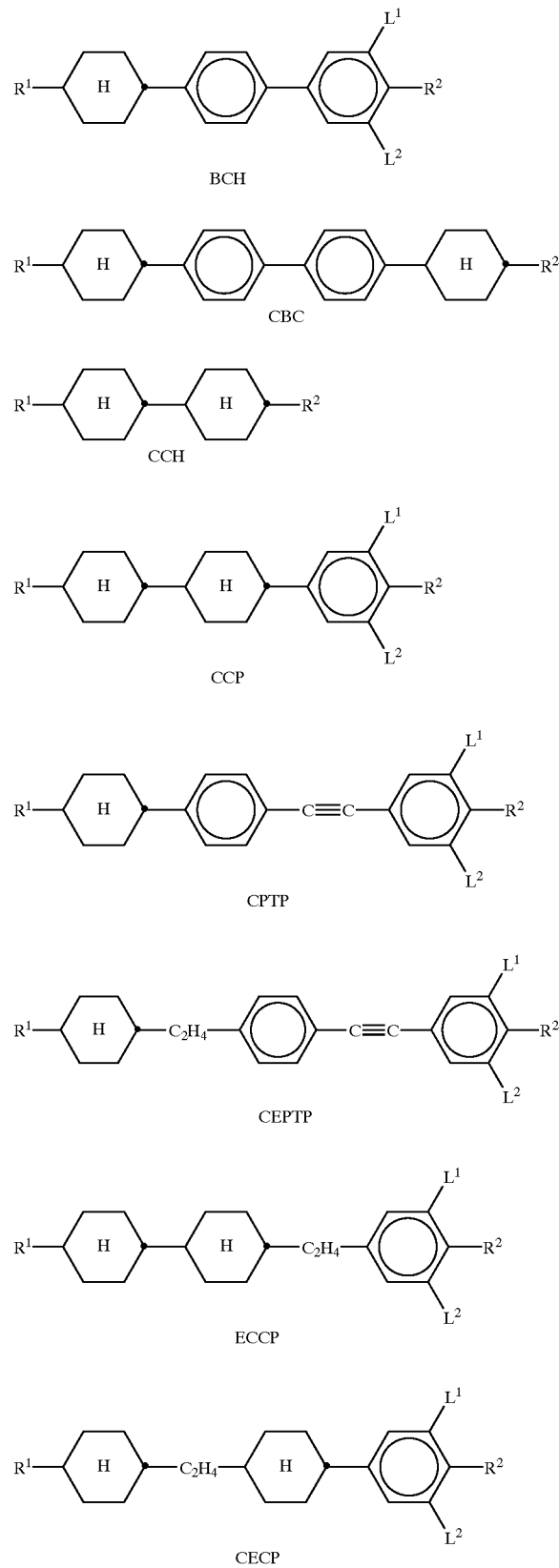

TABLE A-continued
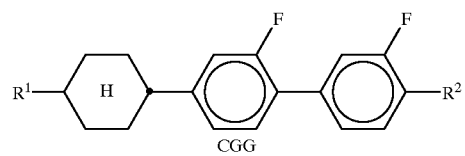
CGG
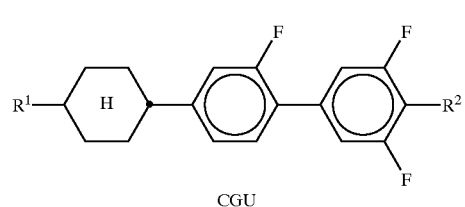
CGU
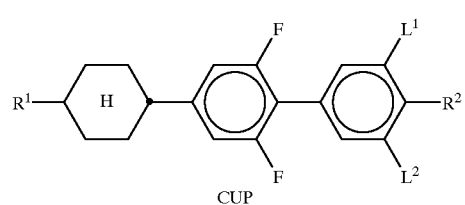
CUP
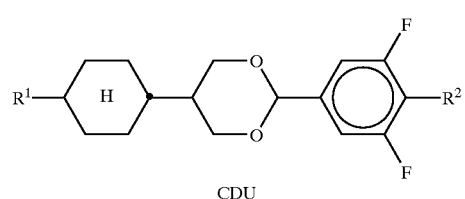
CDU
TABLE B
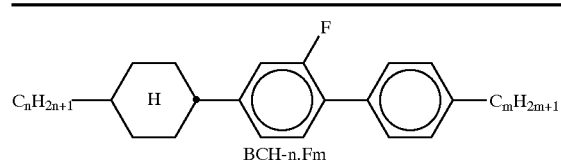
BCH-n.Fm
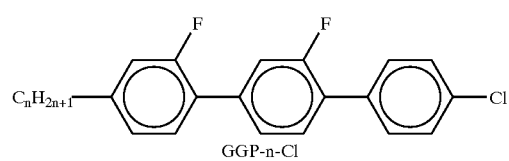
GGP-n-Cl
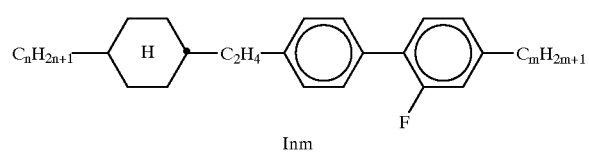
Inm
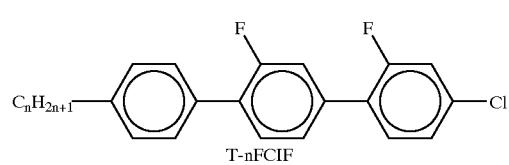
T-nFClF
TABLE B-continued
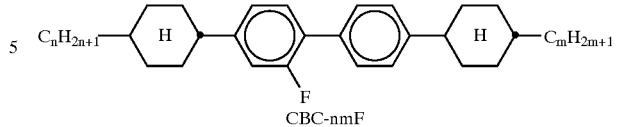
CBC-nmF
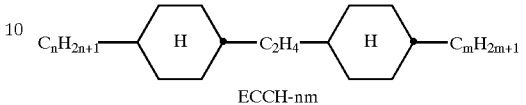
ECCH-nm
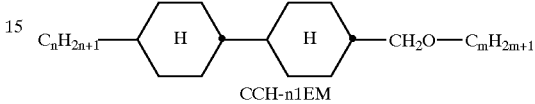
CCH-n1EM
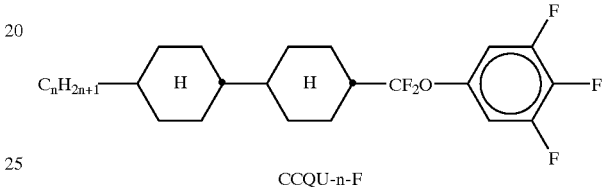
CCQU-n-F
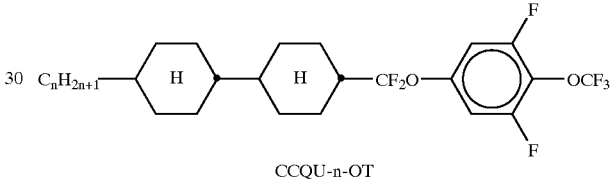
CCQU-n-OT
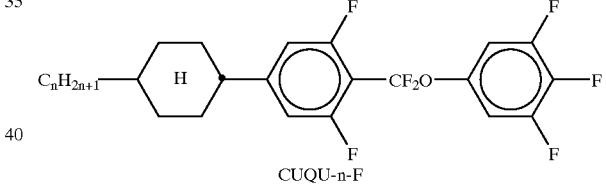
CUQU-n-F
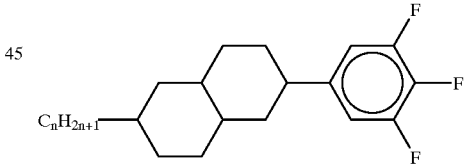
DecU-n-F
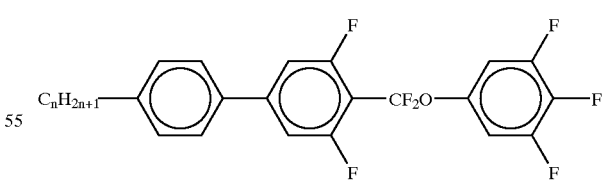
PUQU-n-F
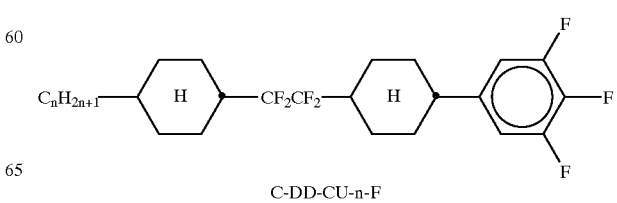
C-DD-CU-n-F TABLE B-continued
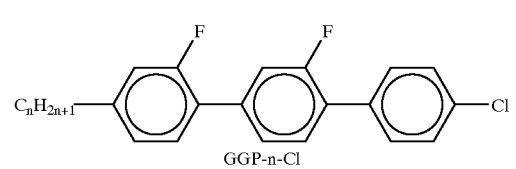
GGP-n-Cl
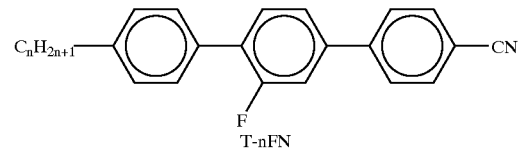
T-nFN
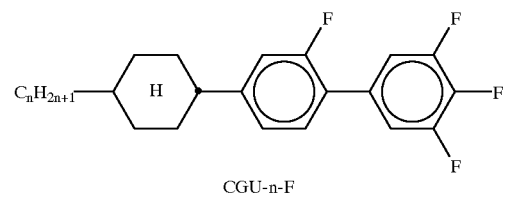
CGU-n-F
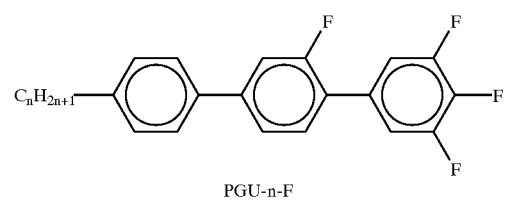
PGU-n-F
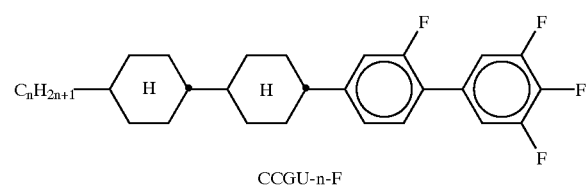
CCGU-n-F
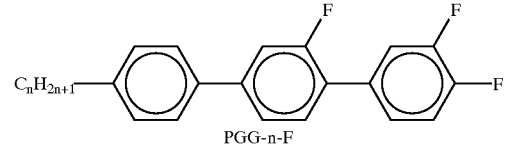
PGG-n-F
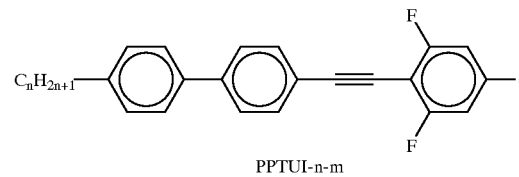
PPTUI-n-m
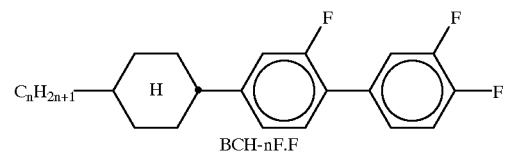
BCH-nF.F
TABLE B-continued
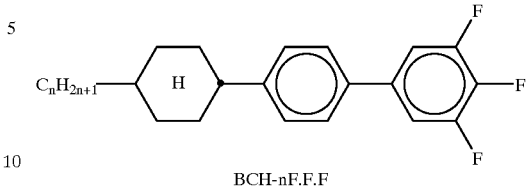
BCH-nF.F.F
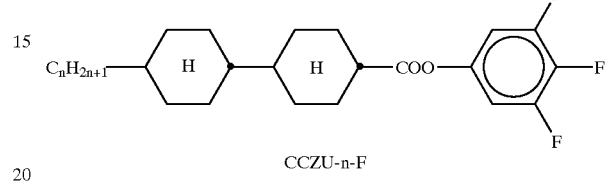
CCZU-n-F
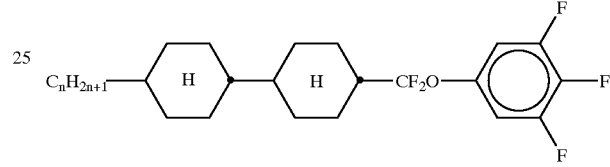
CCQU-n-F
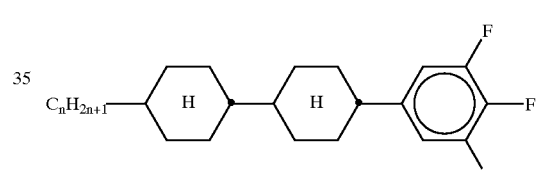
CCP-nF.F.F
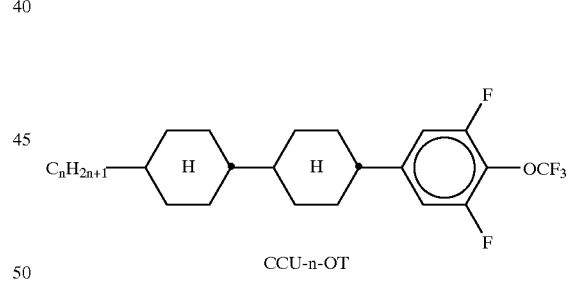
CCU-n-OT
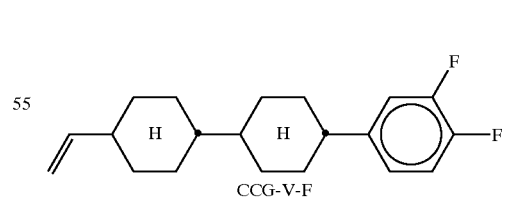
CCG-V-F
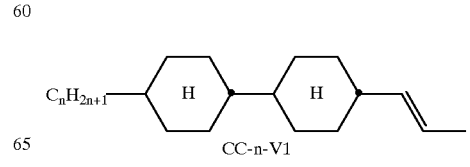
CC-n-V1

TABLE B-continued

BCH-nF.F: $C_nH_{2n+1}$—[H]—[phenyl]—[phenyl with F,F substituents]

CC-n-V: $C_nH_{2n+1}$—[H]—[H]—CH=CH$_2$

The examples below are intended to illustrate the invention without representing a limitation. Above and below, percentages are per cent by weight. All temperatures are given in degrees Celsius. m.p. denotes melting point, c.p.= clearing point. Furthermore, C=crystalline state, N=nematic phase, S=smectic phase and I=isotropic phase. The data between these symbols represent the transition temperatures. Δn denotes the optical anisotropy (589 nm, 20° C.), and the flow viscosity $\nu_{20}$ (mm²/sec) and the rotational viscosity (mPa.s) were each determined at 20° C.

Mixture examples

Example 1

| | | | |
|---|---|---|---|
| PPTUI-3-2 | 25.0% | S → N [° C.]: | <−20 |
| PGU-2-F | 8.0% | Clearing Point [° C.]: | 82 |
| PGU-3-F | 7.0% | Δn [589 nm, 20° C.]: | 0.1988 |
| CCG-V—F | 12.0% | d · Δn | 0.55 |
| BCH—2F.F | 6.0% | twist [°]: | 90 |
| PCH-301 | 19.0% | $V_{(10.0.20)}$ [V]: | 1.78 |
| PCH-302 | 10.0% | | |
| GGP-5-Cl | 13.0% | | |

Example 2

| | | | |
|---|---|---|---|
| PPTUI-3-2 | 27.0% | Clearing Point [° C.]: | +80.0 |
| PGU-2-F | 10.0% | Δn [589 nm, 20° C.]: | +0.2012 |
| PGU-3-F | 10.0% | | |
| BCH—2F.F | 10.0% | | |
| CCG-V—F | 7.0% | | |
| CC-3-V1 | 7.0% | | |
| PTP-201 | 5.0% | | |
| PCH-301 | 18.0% | | |
| PCH-302 | 6.0% | | |

Example 3

| | | | |
|---|---|---|---|
| PPTUI-3-2 | 25.5% | Clearing Point [° C.]: | +83.0 |
| PPTUI-3-4 | 6.0% | Δn [589 nm, 20° C.]: | +0.2024 |
| PGU-2-F | 12.0% | | |
| PGU-3-F | 12.0% | | |
| CCG-V—F | 9.5% | | |
| CC-3-V1 | 7.0% | | |
| PCH-301 | 18.0% | | |
| PCH-302 | 10.0% | | |

Example 4

| | | | |
|---|---|---|---|
| PPTUI-3-2 | 30.0% | Clearing Point [° C.]: | +82.0 |
| PGU-2-F | 11.0% | Δn [589 nm, 20° C.]: | +0.2027 |
| PGU-3-F | 11.0% | | |
| CCG-V—F | 12.0% | | |
| BCH—2F.F | 6.0% | | |
| PCH-301 | 18.0% | | |
| PCH-302 | 12.0% | | |

Example 5

| | | | |
|---|---|---|---|
| PPTUI-3-2 | 25.0% | Clearing Point [° C.]: | +85.0 |
| CPTP-301 | 4.5% | Δn [589 nm, 20° C.]: | +0.2067 |
| PGU-2-F | 11.0% | | |
| PGU-3-F | 10.5% | | |
| BCH—2F.F | 10.0% | | |
| BCH—3F.F | 8.0% | | |
| PCH-301 | 18.0% | | |
| PCH-302 | 13.0% | | |

Example 6

| | | | |
|---|---|---|---|
| PPTUI-3-2 | 25.0% | Clearing Point [° C.]: | +83.0 |
| CPTP-301 | 4.5% | Δn [589 nm, 20° C.]: | +0.1983 |
| PGU-2-F | 11.0% | | |
| PGU-3-F | 10.5% | | |
| BCH—2F.F | 10.0% | | |
| BCH—3F.F | 10.0% | | |
| PCH-301 | 19.0% | | |
| CCH-301 | 10.0% | | |

Example 7

| | | | |
|---|---|---|---|
| PPTUI-3-2 | 18.0% | Clearing Point [° C.]: | +63.0 |
| PGU-2-F | 10.0% | Δn [589 nm, 20° C.]: | +0.1651 |
| PGU-3-F | 6.0% | d · Δn | 0.55 |
| CC-5-V | 18.0% | twist [°]: | 90 |
| CC-3-V1 | 10.0% | $V_{(10.0.20)}$ [V]: | 2.13 |
| PTP-102 | 4.0% | | |
| PTP-201 | 4.0% | | |
| PTP-301 | 4.0% | | |
| PCH-301 | 16.0% | | |
| PCH-302 | 10.0% | | |

Example 8

| | | | |
|---|---|---|---|
| PPTUI-3-2 | 24.0% | Clearing Point [° C.]: | +81.0 |
| PGU-2-F | 6.0% | Δn [589 nm, 20° C.]: | +0.2009 |
| PGU-3-F | 6.0% | d · Δn | 0.55 |
| CCG-V—F | 6.0% | twist [°]: | 90 |
| BCH—2F.F | 7.0% | $V_{(10.0.20)}$ [V]: | 1.75 |
| BCH—3F.F.F | 8.0% | | |
| PCH-301 | 18.0% | | |
| PCH-302 | 10.0% | | |
| GGP-5-C | 15.0% | | |

Example 9

| | | | |
|---|---|---|---|
| PPTUI-3-2 | 25.0% | S → N [° C.]: | <−30.0 |
| PGU-2-F | 8.0% | Clearing Point [° C.]: | +82.0 |
| PGU-3-F | 7.0% | Δn [589 nm, 20° C.]: | +0.2000 |
| CCG-V—F | 15.0% | d · Δn | 0.55 |
| CGU-2-F | 4.0% | twist [°]: | 90 |
| PCH-301 | 18.0% | $V_{(10.0.20)}$ [V]: | 1.69 |
| PCH-302 | 8.0% | | |
| GGP-5-Cl | 15.0% | | |

Example 10

| | | | |
|---|---|---|---|
| PPTUI-3-2 | 25.0% | Clearing Point [° C.]: | 91.7 |
| PGU-2-F | 7.0% | Δn [589 nm, 20° C.]: | 0.1729 |
| PGU-3-F | 7.0% | Δε[1 kHz, 20° C.]: | 6.2 |
| BCH—2F.F | 6.0% | $\gamma_1$ [mPa · s]: | 72 |
| PCH-301 | 20.0% | | |
| PCH-302 | 9.0% | | |
| PUQU-3-F | 7.0% | | |
| BCH-32 | 6.0% | | |
| CCZU-2-F | 5.0% | | |
| CCZU-3-F | 6.0% | | |
| CC-3-V1 | 1.0% | | |

Example 11

| | | | |
|---|---|---|---|
| PPTUI-3-2 | 23.0% | Clearing Point [° C.]: | 95.0 |
| PGU-2-F | 9.0% | Δn [589 nm, 20° C.]: | 0.1969 |
| PGU-3-F | 9.0% | Δε[1 kHz, 20° C.]: | 10.1 |
| PGU-5-F | 6.0% | | |
| CGU-2-F | 10.0% | | |
| CGU-3-F | 8.0% | | |
| PCH-301 | 16.0% | | |
| CBC-33F | 5.0% | | |
| CBC-53F | 5.0% | | |
| CCG-V—F | 9.0% | | |

What is claimed is:

1. A liquid-crystalline medium based on a mixture of polar compounds having positive dielectric anisotropy, said medium comprising one or more compounds of formula I,

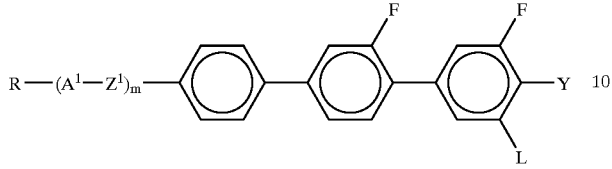

I and one or more compounds of the general formula I*

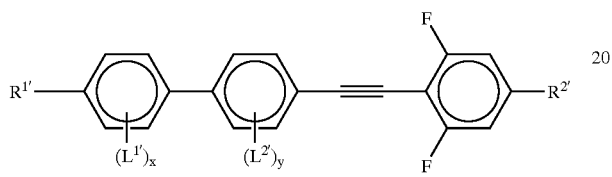

I* in which

R, $R^{1*}$ and $R^{2*}$ are in each case, independently of one another, H, an alkyl or alkenyl radical having 1 to 15 carbon atoms which is unsubstituted, monosubstituted by CN or $CF_3$ or at least monosubstituted by halogen, wherein optionally one or more $CH_2$ groups in the alkyl or alkenyl radical are replaced by, in each case independently of one another,

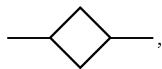

—C≡C—, —CO—, —CO—O—, —O—CO—, —S— or —O—CO—O— in such a way that O atoms are not linked directly to one another, $A^1$ (a) is a trans-1,4-cyclohexylene radical in which, in addition, one or more non-adjacent $CH_2$ groups are each optionally replaced by —O— or —S—, or is a 1,4-cyclohexenylene radical, (b) is a 1,4-phenylene radical, in which, in addition, one or two CH groups are each optionally replaced by N, (c) is a radical selected from of 1,4-bicyclo[2.2.2]-octylene, piperidine-1,4-diyl, naphthalene-2,6-diyl, decahydronaphthalene-2,6-diyl and 1,2,3,4-tetrahydronaphthalene-2,6-diyl, where the radicals (a) and (b) may be monosubstituted, disubstituted or polysubstituted by CN, $CH_3$ or F, $Z^1$ is —CO—O—, —O—CO—, —$CH_2$O—, —O$CH_2$—, —$CH_2CH_2$—, —CH=CH—, —$CF_2$O—, —O$CF_2$—, —C≡C—, —$(CH_2)_4$—, —CH=CH—$CH_2CH_2$— or a single bound, Y is F, Cl, or halogenated alkyl, alkenyl, alkenyloxy, alkoxyalkyl or alkoxy, each having up to 6 carbon atoms, L is H or F, $L^{1*}$ and $L^{2*}$ are in each case independently of one another H or F, x and y are in each case independently of one another 0, 1, 2, 3 or 4, and m is 0 or 1.

2. A medium according to claim 1, wherein said medium additionally comprises one or more compounds selected from formulae II to IX:

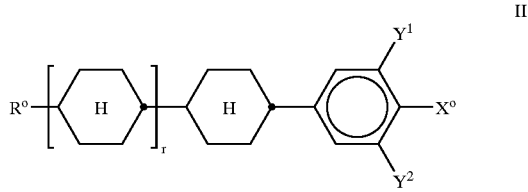

II

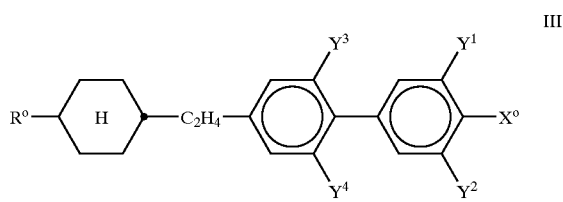

III

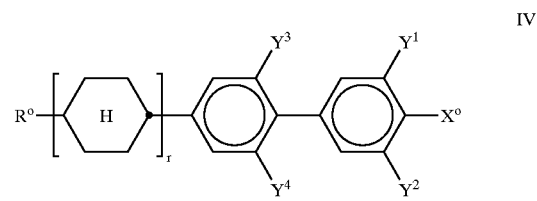

IV

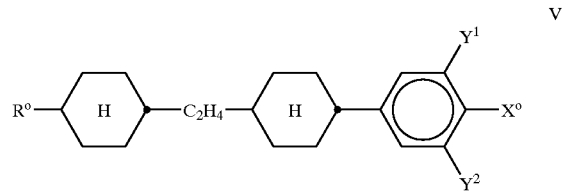

V

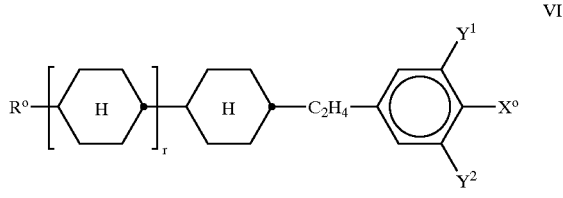

VI

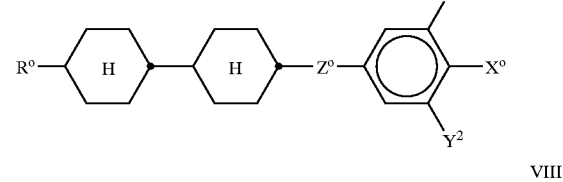

VII

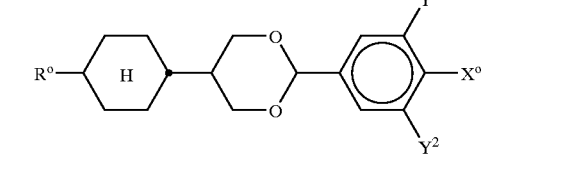

VIII

-continued

IX

[Structure IX: R⁰—H—Z⁰—H—(ring with Y¹, X⁰, Y²)]

in which the individual radicals have the following meanings:
R⁰ is n-alkyl, oxaalkyl, fluoralkyl or alkenyl, in each case having up to 9 carbon atoms,
X⁰ is F, Cl, or halogenated alkyl, alkenyloxy, alkylalkoxy, alkenyl or alkoxy, in each case having up to 6 carbon atoms.
Z⁰ is —CF$_2$O—, —OCF$_2$—, —C$_2$F$_4$—, —COO—, —OCH$_2$-, —CH$_2$O—, —CF=CF— or a single bond,
Y¹ to Y⁴ are in each case, independently of one another H or F,
r is 0 or 1.

3. A medium according to claim 2, wherein the proportion of compounds of the formulae I to IX together is at least 50% by weight in the total mixture.

4. A medium according to claim 1, wherein the proportion of compounds of the formulae I and I* is from 10 to 50% by weight in the total mixture.

5. A medium according to claim 2, wherein the proportion of compounds of the formulae II to IX is from 20 to 80% weight in the total mixture.

6. A medium according to claim 1, wherein said medium comprises a compound of formula 12

12

[Structure 12: R—(ring)—(ring with F)—(ring with F, Y, F)]

in which R and Y are as defined in claim 1.

7. A medium according to claim 6, wherein Y is F, OCHF$_2$ or OCF$_3$.

8. A medium according to claim 1, wherein said medium additionally comprises one or more compounds of the formula

[Structure: R⁰—H—A—(ring with F, F, L¹)]

in which A is [cyclohexyl], [phenyl], [cyclohexenyl], [fluorocyclohexenyl] or [dioxanyl]

R⁰ is n-alkyl, oxaalkyl, fluoroalkyl or alkenyl, each having up to 9 carbon atoms, and
L¹ is H or F.

9. A medium according to claim 2, wherein said medium comprises one or more compounds of formula XI

XI

[Structure XI: R⁰—H—H—(ring with F)—(ring with Y¹, X⁰, Y²)]

in which
R⁰, X⁰, Y¹ and Y² are as defined in claim 2.

10. In an electro-optical liquid-crystal display containing a liquid-crystalline medium, the improvement wherein said medium is a medium according to claim 1.

11. In a method of generating an electro-optical effect using a liquid-crystalline medium, the improvement wherein said medium is a medium according to claim 1.

12. A medium according to claim 2, wherein the proportion of compounds of the formulae I and I* is from 10 to 50% by weight in the total mixture.

13. A medium according to claim 3, wherein the proportion of compounds of the formulae II to IX is from 20 to 80% by weight in the total mixture.

14. A medium according to claim 2, wherein said medium comprises a compound of formulae 12

12

[Structure 12: R—(ring)—(ring with F)—(ring with F, Y, F)]

15. A medium according to claim 14, wherein Y is F, OCHF$_2$ or OCF$_3$.

16. A medium according to claim 2, wherein said medium additionally comprises one or more compounds of the formula

[Structure: R⁰—H—A—(ring with F, F, L¹)]

in which A is [cyclohexyl], [phenyl], [cyclohexenyl], [fluorocyclohexenyl] or [dioxanyl]

R⁰ is n-alkyl, oxaalkyl, fluoroalkyl or alkenyl, each having up to 9 carbon atoms, and
L¹ is H or F.

17. A medium according to claim 14, wherein said medium comprises one or more compounds of formula XI

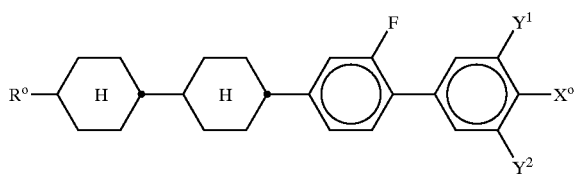

XI

18. A medium according to claim 1, wherein Y is F, Cl, OCF$_3$, OCHF$_2$, CF$_3$, CHFCF$_3$, CFCHF$_2$, C$_2$H$_4$CHF$_2$, CF$_2$CH$_2$CF$_3$, CHF$_2$, OCH$_2$CF$_3$, OCH$_2$CHF$_2$, OCF$_2$CHF$_2$, O(CH$_2$)$_3$CF$_3$, OCH$_2$C$_2$F$_5$, OCH$_2$CF$_2$CHF$_2$, OCH$_2$C$_3$F$_7$, OCHFCF$_3$, OC$_2$F$_5$, OCF$_2$CHFCF$_3$, OCH=CF$_2$, OCF=CF$_2$, OC=CFCF$_3$, OCF=CF—C$_2$F$_5$, CH=CHF, CH=CF$_2$, CF=CF$_2$, or CF$_2$OCF$_3$.

19. A medium according to claim 1, wherein L is F.
20. A medium according to claim 1, wherein m is 0.
21. A medium according to claim 19, wherein m is 0.
22. A medium according to claim 1, wherein Z$^1$ is a single bond, —CH$_2$CH$_2$—, —CH$_2$O—, —OCH$_2$—, —O—CO—.

* * * * *

UNITED STATES PATENT AND TRADEMARK OFFICE
CERTIFICATE OF CORRECTION

| | |
|---|---|
| PATENT NO. | : 6,790,488 B1 |
| APPLICATION NO. | : 10/049020 |
| DATED | : September 14, 2004 |
| INVENTOR(S) | : Hideo Ichinose |

It is certified that error appears in the above-identified patent and that said Letters Patent is hereby corrected as shown below:

Column 27, line 20, in the formula, replace "$R^{1'}$", "$(L^{1'})_x$", "$(L^{2'})_y$", and "$R^{2'}$" with -- $R^{1*}$, $(L^{1*})_x$, $(L^{2*})_y$, and $R^{2*}$ --
Column 27, line 52, reads "selected from of" should read -- selected from --
Column 27, line 60, reads "a single bound," should read -- a single bond, --
Column 29, line 13, reads "fluoralkyl" should read -- fluoroalkyl --
Column 29, line 17, reads "atoms." should read -- atoms, --
Column 29, line 19, reads "-$OCH_2$." should read -- -$OCH_2$- --
Column 29, line 30, reads "weight in the total mixture." should read -- by weight in the total mixture. --
Column 32, line 10, reads "-O-CO-." should read -- -O-CO- or –CO-O --

Signed and Sealed this

Tenth Day of November, 2009

David J. Kappos
*Director of the United States Patent and Trademark Office*